United States Patent [19]

Guo et al.

[11] Patent Number: 5,577,043
[45] Date of Patent: Nov. 19, 1996

[54] METHOD AND APPARATUS FOR CONTROLLING INFORMATION TRANSMISSION ON A MULTIPOINT LINK

[75] Inventors: Eileen J. Guo, Bedford; Jeffrey W. Klingberg, Ft. Worth, both of Tex.

[73] Assignee: Motorola, Inc., Schaumburg, Ill.

[21] Appl. No.: 309,708

[22] Filed: Sep. 21, 1994

[51] Int. Cl.$^6$ .......................... H04L 12/403; H04L 12/40
[52] U.S. Cl. ...................... 370/85.8; 370/85.1; 370/85.7; 370/95.2; 340/825.08; 340/825.06
[58] Field of Search ................................. 370/85.2, 85.3, 370/94.1, 85.8, 95.2, 85.1, 95.1, 85.9, 94.2; 340/825.52, 825.06, 825.07, 825.08

[56] References Cited

U.S. PATENT DOCUMENTS

| | | | |
|---|---|---|---|
| 3,728,681 | 4/1973 | Fuller et al. | 340/147 R |
| 4,251,865 | 2/1981 | Moore et al. | 364/200 |
| 4,742,512 | 5/1988 | Akashi et al. | 370/96 |
| 4,809,268 | 2/1989 | Tejima et al. | 370/93 |
| 4,888,728 | 12/1989 | Shirakawa et al. | 364/900 |
| 5,237,322 | 8/1993 | Heberle | 340/870.13 |
| 5,278,833 | 1/1994 | Crisler et al. | 370/95.1 |
| 5,295,140 | 3/1994 | Crisler et al. | 370/94.1 |
| 5,367,524 | 11/1994 | Rideout, Jr. et al. | 370/104.1 |

OTHER PUBLICATIONS

Roger L. Freeman, "Telecommunication System Engineering", Second Edition, pp. 548–549.

*Primary Examiner*—Wellington Chin
*Assistant Examiner*—Melissa Kay Carman
*Attorney, Agent, or Firm*—Richard A. Sonnentag; Kevin A. Buford

[57] ABSTRACT

A method and apparatus for controlling communications on a multipoint communication link includes a multipoint link (29) coupling plural slave stations (11–13) and a master (10) having a communications controller (35) controlling signaling broadcast to slave stations (11–13) via an encoder (36). Broadcast signals (201–205) each include a time slot marker or identifier associated with a slave station. Master (10) monitors via detector (32) for response signals (211–213) within a window period, and when detected waits until an end of transmission and generates the next broadcast signal with an incremented marker. Master (10) also functions to cycle through broadcast signals to all slave stations (11–13) at an adaptive rate, e.g., more frequently for active as compared with idle or inactive slave stations.

8 Claims, 2 Drawing Sheets

METHOD AND APPARATUS FOR CONTROLLING INFORMATION TRANSMISSION ON A MULTIPOINT LINK

FIELD OF THE INVENTION

The present invention relates generally to communications systems and more particularly to a system for controlling multipoint communications.

BACKGROUND OF THE INVENTION

In communication systems having multiple communication units coupled to a common link, known as a multipoint configuration, there is a need for some form of communications procedure controlling access to the multipoint link. In bandwidth limited systems it is also important to implement methods which, while achieving the necessary communications control, also optimize on the amount of data throughput permitted.

One solution to common link control has been to make one of the communication units a "master" with access control capabilities, and the remaining communication units "slaves." Two common systems implementing this access control solution are roll-call (or broadcast) polling and loop polling. In roll-call polling the assigned master periodically polls each of the slave stations to determine whether there is any information to be communicated. Polling is typically done using a unique address/identifier for each salve station so only that one station will respond, with each slave station being sequentially polled. In loop polling the master only sends one poll request per cycle. When a slave station receives the poll request, it sends any traffic to the master, and then forwards the poll request to the next slave station in the loop. This process is repeated until the last slave station in the loop has received and responded to the poll request.

Both roll-call and loop polling may be implemented as synchronous communications systems. Unfortunately, because of the message length constraints in synchronous transmissions (particularly in bandwidth limited systems) this may lead to the undesirable result of several polling cycles being required to complete just one message from a slave station. Roll-call polling has the further disadvantage of requiring a substantial overhead in the constant polling traffic between the master and each slave station during each cycle. While loop polling reduces some of this overhead by allowing the slave stations to pass on just one poll request, it is undesirable in remote or time-sensitive applications where one faulty slave station could cause a failure of the loop by not passing on the poll request. Likewise, both polling approaches are inconvenient in their requirement that the master be reset each time a slave station is added or dropped from the link.

While asynchronous communications may avoid some of the problems associated with message length constraints, it is typically implemented in some form of a contention procedure. Rather than waiting for a poll request, each unit having traffic to transmit would generate a link access request. However, if multiple units request access at the same time, a collision occurs requiring some form of arbitration or back-down procedure. As can be appreciated, such contention-based systems become increasingly inefficient (i.e., more collisions occur) as more units are added to the link.

Accordingly, there exists a need for a more efficient means of communication control in a system having a common link between multiple units, which increases the data throughput over the link and minimizes the processing of control signaling. There is a particular need for a polling system that allows for an adaptable amount or asynchronous transfer of data so as to minimize the overhead and time required to communicate a message.

DETAILED DESCRIPTION OF AN EMBODIMENT

Figure 1:
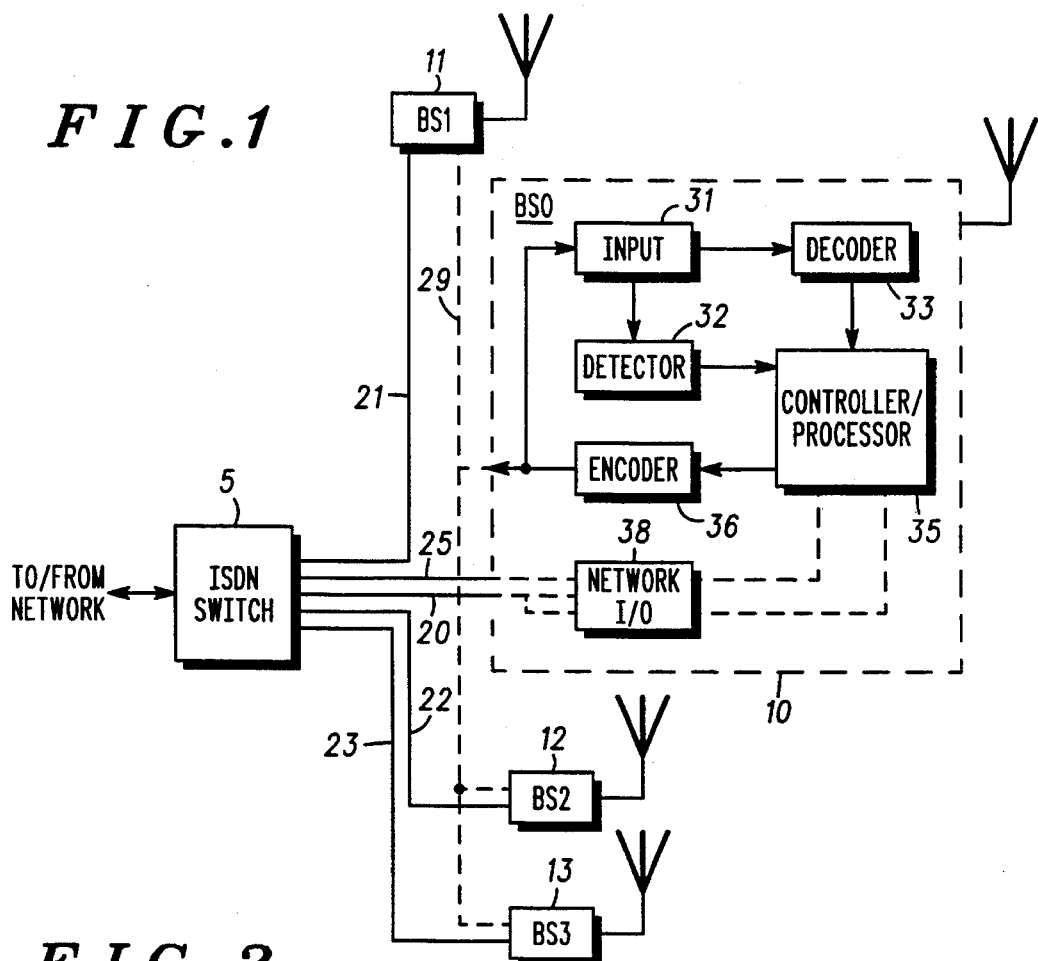
FIG. 1 generally depicts a communication system employing multipoint communication control in accordance with the invention.

These problems and others are met with a method and apparatus for controlling multipoint communications according to the present invention. FIG. 1 shows such a communication system in accordance with one possible embodiment of the invention. In this particular embodiment the communication system is a radiotelephone system having radio communication units or base stations (BS) 10–13, each coupled via links 20–25 to a communication network through a network access unit, in the illustrated case an ISDN (Integrated Services Digital Network) switch 5. The illustrated links could be any form of communication link (twisted pair, coaxial cable, fiber optic or microwave) depending on the system, but in the illustrated case links 20–23 is cable for carrying the two ISDN basic rate interface "B" channels between switch 5 and the respective base stations 10–13, and link 25 is a further cable for the "D" (or control data) channel. Such a configuration is desirable for instance when the group of base stations 10–13 are to be placed in remote locations from the switch 5, or a number of such stations are to be used in a group, and the expected control data is sufficiently low to permit all network-related control data to be communicated over one "D" channel link 25 rather than requiring separate "D" channel links to each base station 10–13. In place of the separate control data links, a common or multipoint link 29 connects the master base station 10 (the base station preferably having the network "D" channel link 25) to the remaining, or slave, base stations.

However, where the; multipoint link has a limited bandwidth, prior art approaches for controlling communications are undesirable for the reasons discussed in the Background above. The present invention solves these problems by providing, with reference to the illustrated embodiment, a system and method for adaptively polling each slave station and permitting each slave station to respond with an adaptable amount or asynchronous transfer of data. This in turn more effectively minimizes the overhead message requirements and optimizes data throughput.

Returning to FIG. 1, certain pertinent functionality/circuitry of an embodiment of a master station BS0 10 is also illustrated. The master 10 includes a network I/O (input/output) device 38 for receiving communications over the "B" and "D" channel links 20, 25. An input device 31, which could simply be a register or buffer coupled to a link interface, is coupled to the multipoint link 29, for receiving messages from the slave stations 11–13. Received messages are decoded in decoder 33 and processed in controller/processor 35. Any information to be forwarded to the network is appropriately processed by controller 35 and forwarded via network I/O 38. Messages destined for slave stations 11–13 are generated by controller 35 and encoded for transmission by encoder/transmitter 36. A detector 32 is coupled so as to monitor slave station traffic, either by sensing input register 31 information (bits), or, when coupled via a port to link 29 by sensing whether or not information is being transmitted on the link 29. The slave stations 11–13 may also be implemented with the same functionality/circuitry and connections as the master 10, except that the "D" channel link 25 is not required to the slave stations 11–13.

While this embodiment illustrates one preferred implementation of a wireless communications system coupled to an ISDN network, it should be understood that the invention also has application to any other type of communication system capable of using multipoint communications. Similarly, while in this embodiment the master base station circuitry discussed has been logically separated, a skilled artisan will appreciate that the actual implementation of these functions may be accomplished in a variety of different manners including, but not limited to, properly programming a digital signal processor (DSP), coupling discrete components together, and using a combination of one or more application specific integrated circuits (ASICs). It should thus be understood that the description of this embodiment is intended for illustration and not a limitation on the scope of the invention.

Figure 2:
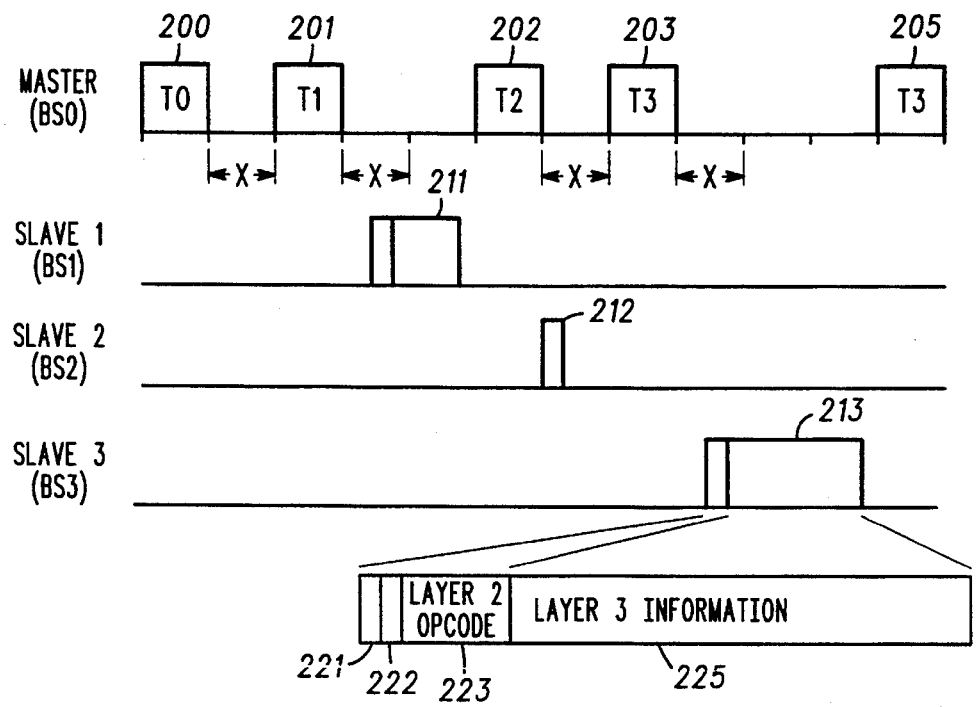
FIG. 2 illustrates timing, size and content of information transmissions that may be sent by a master and slave stations in accordance with the invention.

Turning now to FIG. 2, the timing, size and content of information transmissions that may be sent by master 10 are illustrated. Master 10 controls the transmission of all slave units 11–13 on the multipoint link 29 by transmitting broadcast signals 200–205, letting the slave stations know when to transmit. The labels T1–T3 in signals 201–205 designate the associated addressee BS1–BS3 11–13 identified in the respective broadcast signal via a time slot marker or other identifier (e.g., a destination addressee). When the master is transmitting using an internal reference time period to define time slots, it alternately transmits a broadcast signal in a first time slot portion and monitors for a response in the next time slot portion (designated by the "x"s in FIG. 2 following each signal 200–203). A time slot can be also be determined based solely on the time between the start (or similar repeated portion) of adjacent master station transmissions. Whether or not a time-slotted approach is used, each "x" represents a window period in which the master will standby monitoring for a reply transmission.

Figure 4:
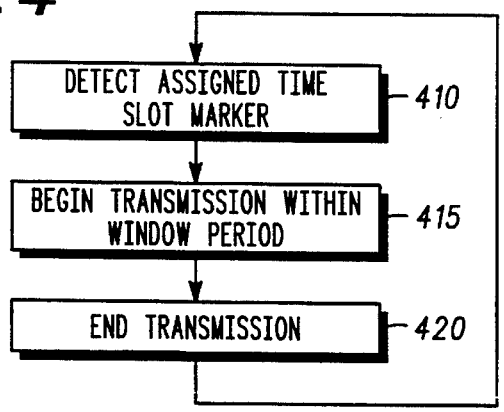
FIG. 4 is a flow chart illustrating the steps for communicating by a slave station in the communication system of claim 1 according to an embodiment of the invention.

When slave stations 11–13 (BS1–BS3) receive broadcast signals 201–203, respectively, each respective slave station 11–13 detects its assigned identifier or time slot marker and commences transmission within the window period x (see steps 410–420 of FIG. 4). However, the slave stations 11–13 are not constrained by the window or time slots, and may continue transmitting a response signal 211–213 until the complete message has been sent. Response signal 213 illustrates a typical such signal, which has a first, minimum portion (such as sent in response signal 212) including, e.g., a destination identifier 221, an origination identifier 222, and a link layer (i.e., OSI (Open Systems Interconnection) layer 2) code 223. This minimum portion can, when sent alone, serve as an acknowledgment signal notifying the master 10 that the slave station is still active. A second portion 225 contains any OSI layer 3 (or higher) information.

In addition to sending broadcast signals directed at each slave station on a cyclical basis, controller 35 is also operable to broadcast control messages applicable to all of the slave stations having, e.g., a group address or the like as an identifier. Such general broadcast messages are illustrated by signal 200. Further, rather than delay any acknowledgment of certain slave station messages until the next cycle's broadcast signal, controller 35 can be adapted to send an acknowledgment broadcast immediately after the slave station response, out of the otherwise typical sequence of broadcast signaling. See, e.g., broadcast signal 205 to slave station 13 (BS3), immediately after prior broadcast signal 203 to the same slave station.

Figure 3:
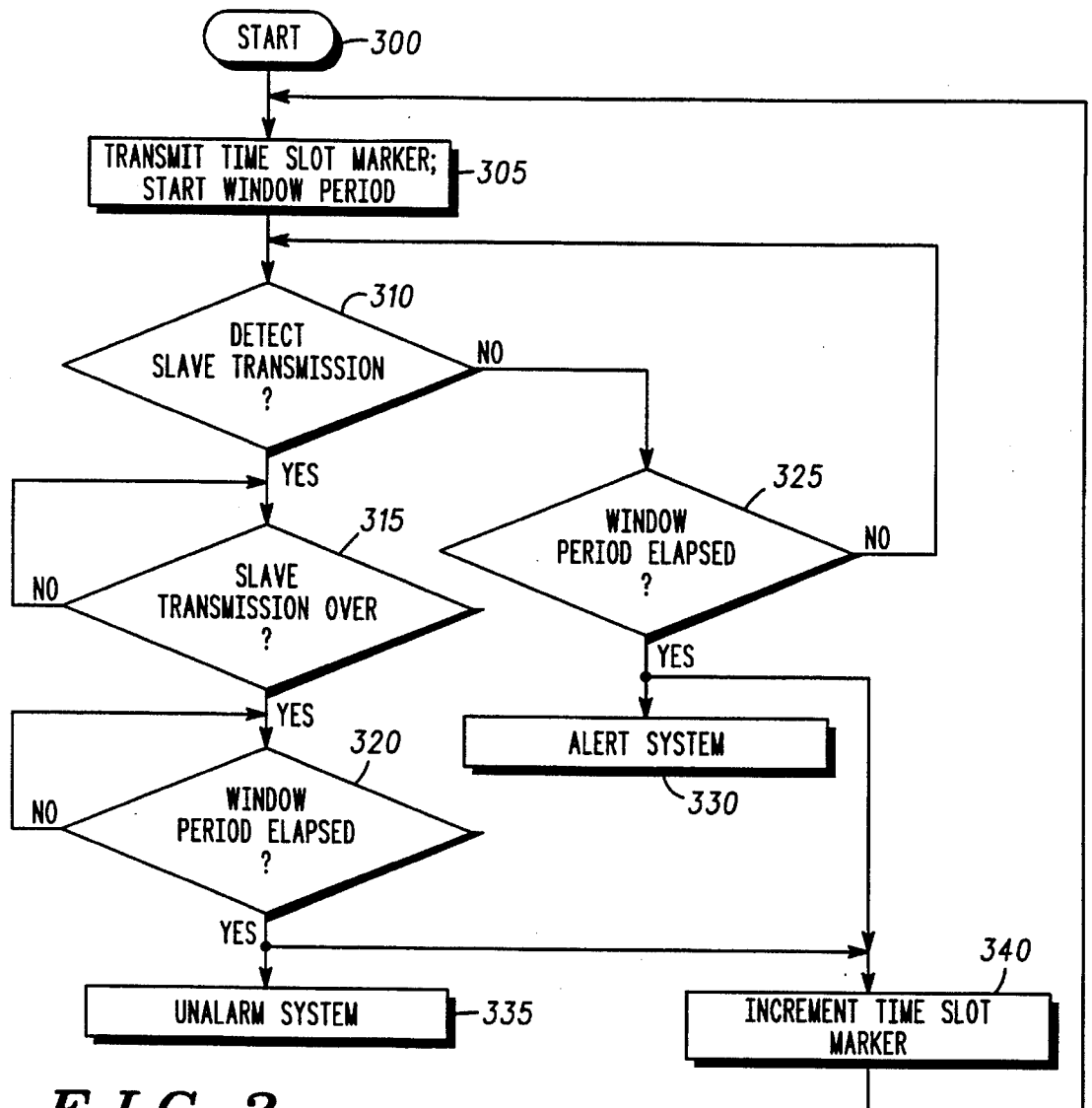
FIG. 3 is a flow chart illustrating the steps for controlling communications by the master station in the communication system of claim 1 according to an embodiment of the invention.

FIG. 3 further illustrates the process by which master 10 controls link 29 communications. Following transmission of the broadcast signal, detector 32 monitors for window period x for a response signal from the slave station corresponding to the transmitted marker. If a response signal is detected, detector 32 will continue to monitor for when the response signal transmission is finished. A similar or same window period x may also be used to keep the master from retransmitting before a set time (this may be used, e.g., when a minimum processing time for other tasks is desired before returning to master slave transmissions). Once the detector 32 detects an end of transmission or absence of further transmission, as well as an elapsed window period, it notifies controller 35. Controller 35 then prepares the next broadcast signal, incrementing the marker as appropriate for the next target slave station. Similarly, if no response signal is detected within the window period, controller 35 increments the marker and sends the next information message to encoder 36 for encoding and transmission to the next target slave station. Depending on preset criteria, e.g., occurrence of a number n of broadcast signals without response, controller 35 is programmed to alert a system operator via switch 5 about the lack of slave station activity. Once a response is detected again, an unalarm signal is sent. (Steps 300–340).

This process of broadcast polling is preferably repeated on a cyclical basis for all slave stations 11–13. Thus, when all slave stations are sending information traffic (i.e., are active) the controller 35 of master 10 will cause a sequential cycle of broadcast signals 201–203 to be repeatedly transmitted. However, in order to maximize on throughput capacity for active slave stations it is also preferable to cyclically broadcast signals for idle slave stations, such as those only responding with a minimum acknowledgment signal, at a less frequent periodic rate. For example, after a predetermined number of acknowledgment-only responses from a slave station, such as response 212 in FIG. 2 for BS2, controller 35 could operate to re-broadcast signal 202 only once every m, e.g., five, cycles of the repeating broadcast of signals 201 and 203 for active slave stations 11 and 13.

Additional periodic cycles for other categories of response can also be readily implemented by one skilled in the art. For example, when one or more slave stations fail to respond for n cycles, in addition to generating an alarm for the system operator the controller 35 can periodically, although at a much slower periodic rate, poll the slave station to determine whether it is communicating again. Similarly, rather than reconfiguring the master 10 each time an expansion base station is added to the multipoint link 29, the master 10 can be preset with a number of logical identifiers for association with the yet-to-be-added slave stations. The master 10 will periodically (e.g., once every y minutes or z active cycles) broadcast a signal with the logical identifiers. When a new or replacement slave station is installed on the multipoint link 29 assigned the logical identifier it will automatically be polled. When a response is first received controller 35 will change the periodic cyclical rate fox broadcast signals for the unit, and notify the system operator that the inactive station is now active.

The controller 35 can further be configured to broadcast information out of sequential order, to adaptively vary the window period, and to vary how the slave stations respond to a broadcast signal. This adaptive capability is particularly useful under heavy traffic situations, when the need for more capacity may justify reducing the standard signaling timing margins and increase the risk of possible quality degradations, collisions, and the like. The controller in such configuration additionally monitors the length of time for completing an active unit cycle. When the cycle period times out, the controller would adjust the amount of other signaling, such as by reducing the frequency of broadcasts for inactive units. It could additionally shorten the window period, and notify each slave station via a general broadcast to shorten their window for responding. Likewise, each slave station could be instructed via a general broadcast to cease any acknowledgment-only transmissions. Because there would no longer be a means for distinguishing between logical/ inactive units and idle units in this mode, the master would also cease any transmissions to the logical/inactive units until traffic loading had decreased beneath a set threshold level, and only broadcast to the active/idle units. Thus, only information-bearing responses would be sent by the slave stations, and the master would more rapidly cycle past any idle slave stations. One skilled in the art will understand how to implement these and other adaptive features that may be found desirable by the system operators.

There has thus been shown a multipoint communication system permitting adaptive control of a multipoint link with adaptive length/asynchronous response messaging and increased throughput. While the invention has been described with reference to an illustrative embodiment thereof, it will be apparent to one skilled in the art that various modifications and changes can be made without departing from the spirit and the scope of the invention. Rather, the scope of the invention should be understood in view of the claims below.

We claim:

1. A method for controlling information transmission on a multipoint link by a first communication unit, comprising:

(a) transmitting at least a portion of a group of signals, wherein the portion includes a first signal and each of a group of signals includes a base station identifier corresponding to a respective base station, at a first periodic rate, and, in response to a predetermined number of transmissions of the first signal followed by an acknowledgment response signal, cyclically transmitting the first signal at a second periodic rate, the second periodic rate being slower than the first periodic rate;

(b) detecting a response signal on the multipoint link being transmitted in response to the first signal;

(c) detecting one of a group consisting of an acknowledgment response signal and an information response signal; and (d) detecting when the response signal is no longer being transmitted, and transmitting a next signal including a next identifier on the multipoint link.

2. The method of claim 1 wherein the first signal is transmitted in a first time slot portion i and the response signal is asynchronously transmitted and detected starting in a second time slot portion immediately following the first time slot portion, such that the step of detecting in step (d) occurs in one of the second and a further time slot portion depending on a length of the response signal.

3. The method of claim 2 wherein the first and second time slot portions are in a same time slot, and the second time slot portion comprises a predetermined window period.

4. The method of claim 1 wherein the response signal of step (b) is an information response signal, and step (d) comprises, before transmitting a next signal, the steps of (i) transmitting a further signal including the base station identifier and an acknowledgment of the information response signal, (ii) detecting a further response signal, and (iii) detecting when the further response signal is no longer being transmitted, and then transmitting the next signal.

5. A communication unit capable of serving as a master to other communication units on a multipoint link, comprising:

(a) transmitter means coupled to the multipoint link, for transmitting a first signal including a first identifier associated with a first slave communication unit on the multipoint link;

(b) detector means coupled to the multipoint link, for detecting that a response signal to the first signal is being transmitted on the multipoint link and, when the response signal is detected, detecting that the response signal is no longer being transmitted; and (c) control means operatively coupled to the detector means and transmitter means, for controlling the transmitter means, in response to the detector means detecting that the response signal is no longer being transmitted, to transmit a next signal including a next identifier associated with another slave communication unit on the multipoint link, wherein the transmitter means comprises an encoder operable for receiving a first information signal component including a first time slot marker as the first identifier from the control means and encoding the first information signal components into the first signal.

6. The communication unit of claim 5 wherein the detector means comprises an input register coupled to the multipoint link, and a detector coupled to the input register and control means operable for detecting presence and absence of the response signal in the input register and outputting an idle data signal to the control means in response to the detected absence of the response signal for a predetermined period of time.

7. The communication unit of claim 5 wherein the control means is further operable for controlling the transmitter means to transmit cyclically at least a portion of a group of signals, wherein the portion includes the first signal and each of the group of signals includes a unique communication unit identifier corresponding to a respective unique communication unit, at a first periodic rate, and, in response to a predetermined number of transmissions of the first signal followed by an acknowledgment response signal, to cyclically transmit the first signal at a second periodic rate, the second periodic rate being slower than the first periodic rate.

8. The communication unit of claim 7, wherein the control means is further operable for controlling the transmitter means to transmit cyclically each of a second portion of the group of signals, wherein each of the unique communication units corresponding to the unique communication unit identifiers of the second portion is idle, at the second periodic rate, and to transmit cyclically a third portion of the group of signals, wherein each of the unique communication units corresponding to the unique communication unit identifiers included in third portion are not currently communicating on the multipoint link, at a third periodic rate which is slower than the second periodic rate.

* * * * *